United States Patent [19]
Yokoyama et al.

[11] Patent Number: 5,375,256
[45] Date of Patent: Dec. 20, 1994

[54] BROADBAND RADIO TRANSCEIVER

[75] Inventors: Yukio Yokoyama; Hiroyuki Iwasaki, both of Tokyo, Japan

[73] Assignee: NEC Corporation, Japan

[21] Appl. No.: 940,080

[22] Filed: Sep. 3, 1992

[30] Foreign Application Priority Data

Sep. 4, 1991 [JP] Japan ................................. 3-253149

[51] Int. Cl.⁵ .................................................. H04B 1/46
[52] U.S. Cl. .................................... 455/80; 455/82; 455/83; 455/90; 455/129; 333/129
[58] Field of Search ......................... 455/80, 82–84, 455/89–90, 97, 128, 129, 281–282, 289, 290; 333/129, 131, 132

[56] References Cited

U.S. PATENT DOCUMENTS

| | | | |
|---|---|---|---|
| 3,134,075 | 5/1964 | Langevin | 455/97 |
| 3,305,779 | 2/1967 | Errichiello | 455/97 |
| 3,891,947 | 6/1975 | Debost | 455/83 |
| 4,055,807 | 10/1977 | Priniski et al. | 455/83 |
| 4,170,756 | 10/1979 | Sheppard | 455/82 |
| 4,181,889 | 1/1980 | Davis et al. | 455/129 |
| 4,209,758 | 6/1980 | Snedkervd et al. | 455/129 |
| 4,229,826 | 10/1980 | Wanzer | 455/83 |
| 4,476,578 | 10/1984 | Gaudin et al. | 455/129 |

FOREIGN PATENT DOCUMENTS

| | | | |
|---|---|---|---|
| 0214625 | 9/1986 | Japan | 455/83 |
| 0187733 | 8/1988 | Japan | 455/129 |
| 0435442 | 12/1992 | Japan | 455/83 |

*Primary Examiner*—Reinhard J. Eisenzopf
*Assistant Examiner*—Andrew Faile
*Attorney, Agent, or Firm*—Ostrolenk, Faber, Gerb & Soffen

[57] ABSTRACT

A radio transceiver having improved impedance matching characteristics between a rod-like antenna and transmitting and receiving portions. An impedance matching circuit is provided between the antenna and a duplexer to impedance-match therebetween at a frequency within a desired signal frequency band. A transmitting signal and a receiving signal may have substantially different frequencies in which case the impedance matching circuit operates advantageously in a range between these signals, respectively. The impedance matching circuit includes a first inductor inserted between the antenna and the duplexer, a first capacitor inserted between the antenna and ground potential, and a parallel resonance circuit composed of a parallel circuit of a second capacitor and a second inductor inserted between the duplexer and ground potential.

12 Claims, 6 Drawing Sheets

BROADBAND RADIO TRANSCEIVER

BACKGROUND OF THE INVENTION

1. Field of the Invention

The present invention relates to a radio transceiver for transmitting and receiving electromagnetic waves through a rod-like antenna such as a whip antenna, etc., and, particularly, to a radio transceiver capable of maintaining the antenna gain of such a rod antenna in an entire signal frequency band for which it is used.

2. Description of the Related Art

In a conventional portable radio transceiver such as a portable telephone set, a rod-like antenna such as a whip antenna having an antenna element a half wavelength long has been used mainly. Such a rod antenna has the advantage that it provides substantially the same radiation pattern and antenna gain as those of a dipole antenna, with minimal variations, even when the transceiver is worn on the head of the user. Further, such a rod antenna improves the portability of the transceiver since it can be easily retracted within the transceiver set by reducing the length of the antenna element. Radiation impedance of such a rod antenna is as high as several hundreds ohms or more.

The radio transceiver further comprises a duplexer connected to a feed point of the rod antenna for separating a transmitting signal to be supplied from a transmitting section of the transceiver to the rod antenna from a receiving signal to be supplied from the rod antenna to a receiving section of the transceiver. However, since the input/output impedance of the duplexer is usually designed to be of the order of 50 ohms, it is necessary to provide an impedance matching circuit between the duplexer and the rod antenna for preventing reduction of antenna gain in an operating signal frequency range.

An example of such an impedance matching circuit is disclosed in Japan Kokai (P) Sho 63-176003 (publication date: Jul. 20, 1988). The disclosed impedance matching circuit has a construction of low-pass filter including an inductor connected in series with a transmission line and a capacitor connected in parallel to the same transmission line and functions to optimize impedance matching between a rod antenna and a transceiver at a frequency which is substantially an intermediate frequency between a transmitting signal frequency (referred to as "transmitting frequency") and a receiving signal frequency (referred to as "receiving frequency").

A frequency band in which the impedance matching circuit exhibits optimum impedance matching between the rod antenna and the duplexer is only several percent (%) of an intermediate portion between the transmitting frequency and the receiving frequency, where the impedance matching condition is sufficient to obtain a VSWR of not more than 2.0 (return-loss of 9.6 dB). Therefore, in such a radio transceiver, when the operating signal frequency band used is very wide or the transmitting frequency is much different from the receiving frequency, it is impossible to obtain good impedance matching between the antenna and the duplexer in a desired signal frequency band even if such an impedance matching circuit is used, and thus reduction of effective antenna gain over the operating signal frequency band except a portion thereof.

SUMMARY OF THE INVENTION

Therefore, an object of the present invention is to provide a radio transceiver for transmitting and receiving electromagnetic waves in an operating signal frequency band through a rod antenna, which is capable of maintaining the antenna gain of the rod antenna in the operating signal frequency band.

Another object of the present invention is to provide a radio transceiver for transmitting and receiving electromagnetic wave in a certain signal frequency band through a rod antenna which is capable of maintaining the antenna gain of the rod antenna due to impedance mismatching in the entire frequency band even if a transmitting frequency and a receiving frequency are much different from each other.

The radio transceiver according to the present invention comprises a rod type antenna for transmitting a transmitting signal and receiving a receiving signal through electromagnetic waves, and a duplexer for receiving the receiving signal at an antenna terminal and supplying it from a receiving terminal to a receiving portion and for receiving the transmitting signal from a transmitting portion at a transmitting terminal and supplying it from the antenna terminal to a feed point of the antenna. The rod type antenna is retractable in a housing of the radio transceiver and has an antenna element whose length can be extended up to a ⅝ wavelength corresponding to an intermediate frequency between the transmitting frequency and the receiving frequency. The radio transceiver further comprises an impedance matching circuit provided between the rod antenna and the duplexer for matching impedance therebetween.

The impedance matching circuit includes an impedance conversion circuit composed of a first inductor connected between the feed point of the rod antenna and the antenna terminal of the duplexer and a first capacitor connected between the feed point and ground potential and a parallel resonance circuit composed of a parallel circuit of a second inductor and a second capacitor connected between the antenna terminal and the ground potential and resonating at substantially the intermediate frequency. By suitably selecting constants of these inductors and capacitors, the impedance matching circuit operates to match impedance between the antenna and the duplexer at the transmitting frequency as well as the receiving frequency. As a result, it is possible to obtain an impedance matching between the rod antenna and the duplexer when the transmitting frequency is close to the receiving frequency or even when the both frequencies are much different from each other. Therefore, reduction of antenna gain in both of the transmitting frequency band and the receiving frequency band can be prevented.

BRIEF DESCRIPTION OF THE DRAWINGS

The above-mentioned and other objects, features and advantages of the present invention will become more apparent from the following detailed description when taken in conjunction with the accompanying drawings, wherein.

DETAILED DESCRIPTION OF THE PREFERRED EMBODIMENT

Figure 1:
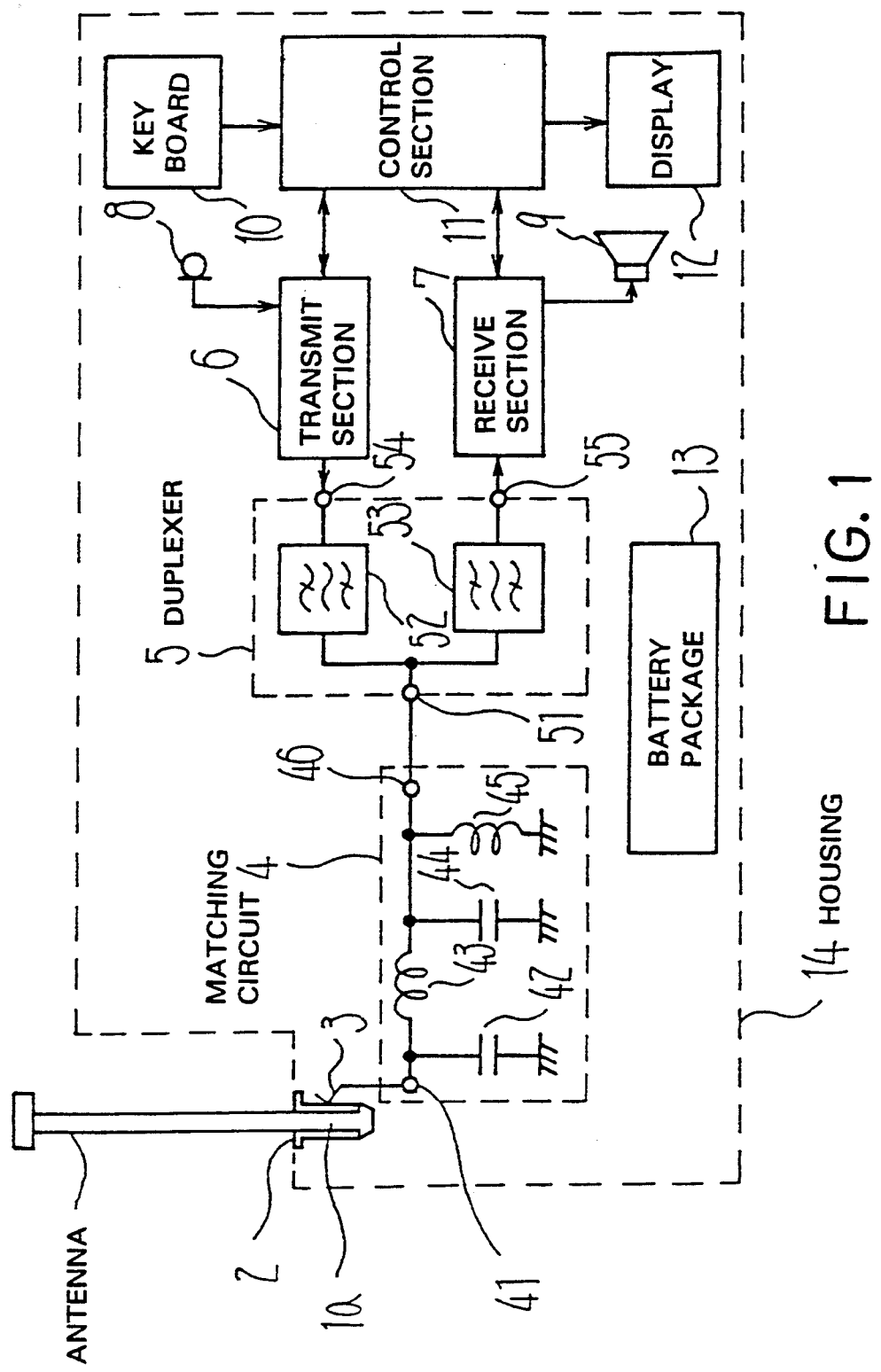
FIG. 1 is a block circuit diagram of an embodiment of the present invention
Figure 2A:
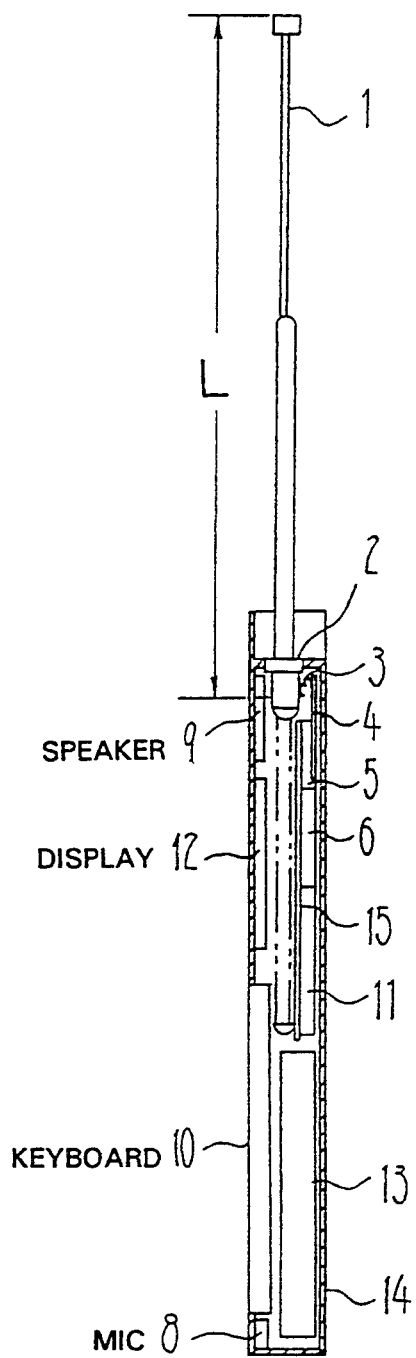
FIG. 2(a) is a cross sectional side view of the embodiment in FIG. 1.
Figure 2B:
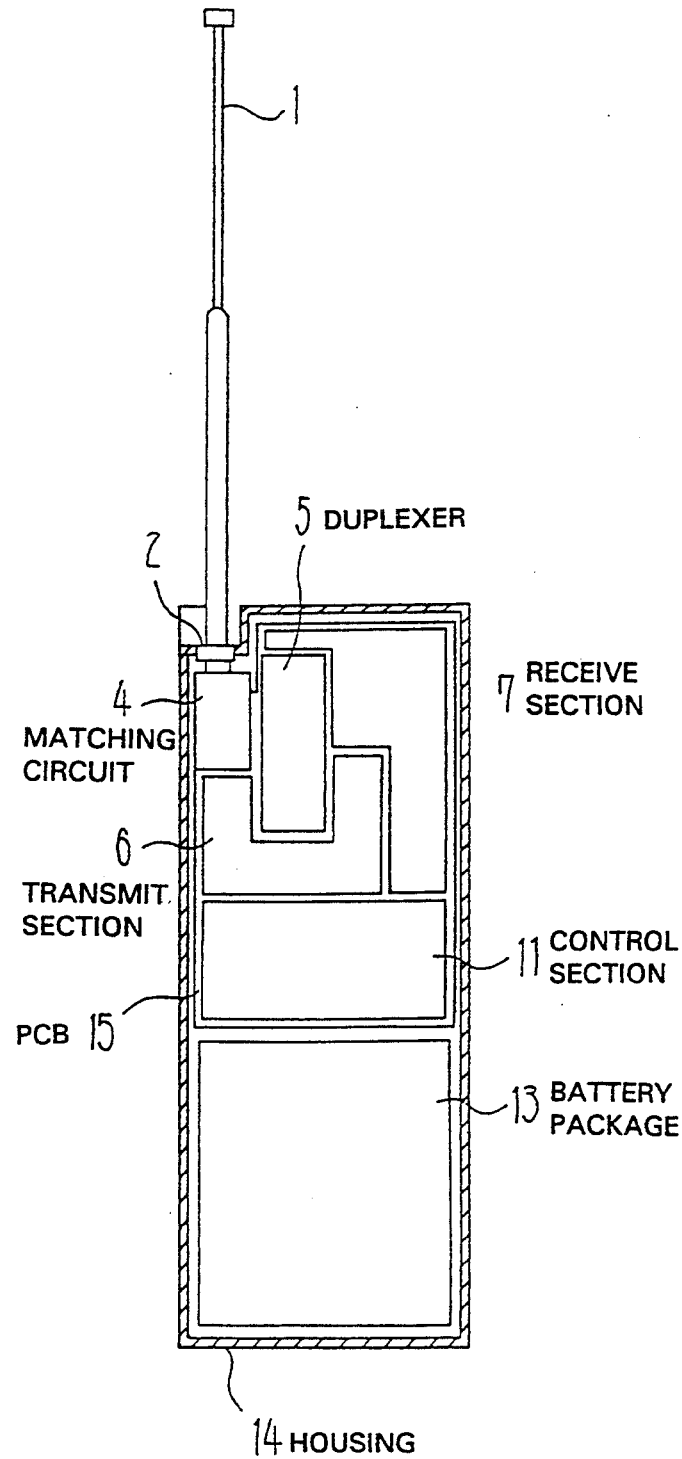
FIG. 2(b) is a cross sectional front view of the embodiment in FIG. 1.

Referring to FIGS. 1, 2(a) and 2(b), a portable transceiver is adapted to transmit a transmitting signal as an electromagnetic wave through a rod type antenna 1 such as a whip antenna and receives electromagnetic waves as a receiving signal through the same antenna. An element length L of this antenna 1 is variable. That is, in use of this radio transceiver, the antenna element length L is extended to a length corresponding to substantially a half wavelength corresponding to an intermediate frequency between the transmitting frequency and the receiving frequency and, when the transceiver is not used, the antenna 1 can be retracted in a housing 14 of the transceiver for convenience of transportation as shown by a chain line in FIG. 2(a). A feed point 1a of the antenna 1 is electrically connected to a conductive support portion 2 and mechanically supported by the housing 14. The feed point 1a is further connected to an antenna connecting terminal 41 of an impedance matching circuit 4 through a connecting portion 3 of a resilient conductive member connected to the support portion 2. A signal receiving terminal 46 of the impedance matching circuit 4 is connected to an antenna terminal 51 of a duplexer 5 for separating the transmitting signal from the receiving signal.

The impedance of the antenna 1 as seen from the feed point 1a thereof is very high and of the order of several hundreds ohms or more. On the other hand, the impedance of the duplexer 5 as seen from the antenna terminal 51 is generally designed to be of the order of 50 ohms. Therefore, the impedance matching circuit 4 serves to match impedances of the antenna and the duplexer at the transmitting and receiving frequencies, preventing the gain of the antenna 1 from being reduced.

The impedance matching circuit 4 includes an impedance conversion circuit composed of a first inductor 43 inserted between the antenna terminal 41 and the signal receiving terminal 46 and first capacitor 42 connected between the antenna connecting terminal 41 and the ground potential, and a parallel resonance circuit composed of a parallel circuit of a second inductor 45 and second capacitor 44 connected between the signal receiving terminal 46 and the ground potential and resonating at substantially the intermediate frequency between the transmitting signal frequency and the receiving frequency. By selecting constants of the inductors 43 and 45 and the capacitors 42 and 44 suitably, the impedance matching circuit 4 provides good impedance matching between the antenna and the duplexer in the transmitting signal frequency band as well as the receiving signal frequency band. Even if the transmitting signal frequency and the receiving signal frequency are different considerably from each other, the matching circuit 4 can provide good impedance matching in each frequency band and, therefore, reduction of gain of the antenna 1 in the entire operating signal frequency band can be prevented. Selection of the constants of the inductors 43 and 45 and the capacitors 42 and 44 of the matching circuit 4 will be described later with reference to FIG. 4.

The duplexer 5 includes a pair of parallel band-pass filters 52 and 53 having inputs connected to the antenna terminal 51. The duplexer 5 selects a receiving signal received at the antenna terminal 51 through the antenna 1, the support portion 2, the connecting portion 3 and the impedance matching circuit 4 by passing it through the band-pass filter 53. The receiving signal thus selected and appearing at a receiving terminal 55 is processed by a receiving section 7 and converted into acoustic wave by an earpiece speaker 9. On the other hand, the audio signal from a mouthpiece microphone 8 is converted into a transmitting signal by a transmitting section 6. This transmitting signal is supplied to a transmitting terminal 54 of the duplexer 5 and, after being filtered by a band-pass filter 52, to the antenna terminal 5. The same transmitting signal is further supplied to the feed point 1a of the antenna 1 through the matching circuit 4, the connecting portion 3 and the support portion 2.

Incidentally, the transceiver, which may be a portable telephone set shown in FIGS. 1 and 2, includes a control section 11 for controlling operations of various constitutional elements of the telephone set, a keyboard 10 for inputting a transmitting signal, etc., to the control section 11, a display section 12 for displaying a receiving signal, etc., according to an instruction from the control section 11 and a battery package 13 for supplying power to these elements, etc. The duplexer 5, the transmitting section 7 and the control section 11 may be mounted on a same printed circuit board 15.

Although, in the portable telephone set, the transmitting signal and the receiving signal are separated in frequency range from each other by the duplexer 5, such signal separation may be performed by the transmitting section 6 and the receiving section 7, without any duplexer. In such a case, the transmitting signal output terminal of the transmitting section 6 and a receiving signal input of the receiving section 7 are connected to a con, non terminal which constitutes the antenna terminal 51 shown in the embodiment shown in FIG. 1.

Figure 3:
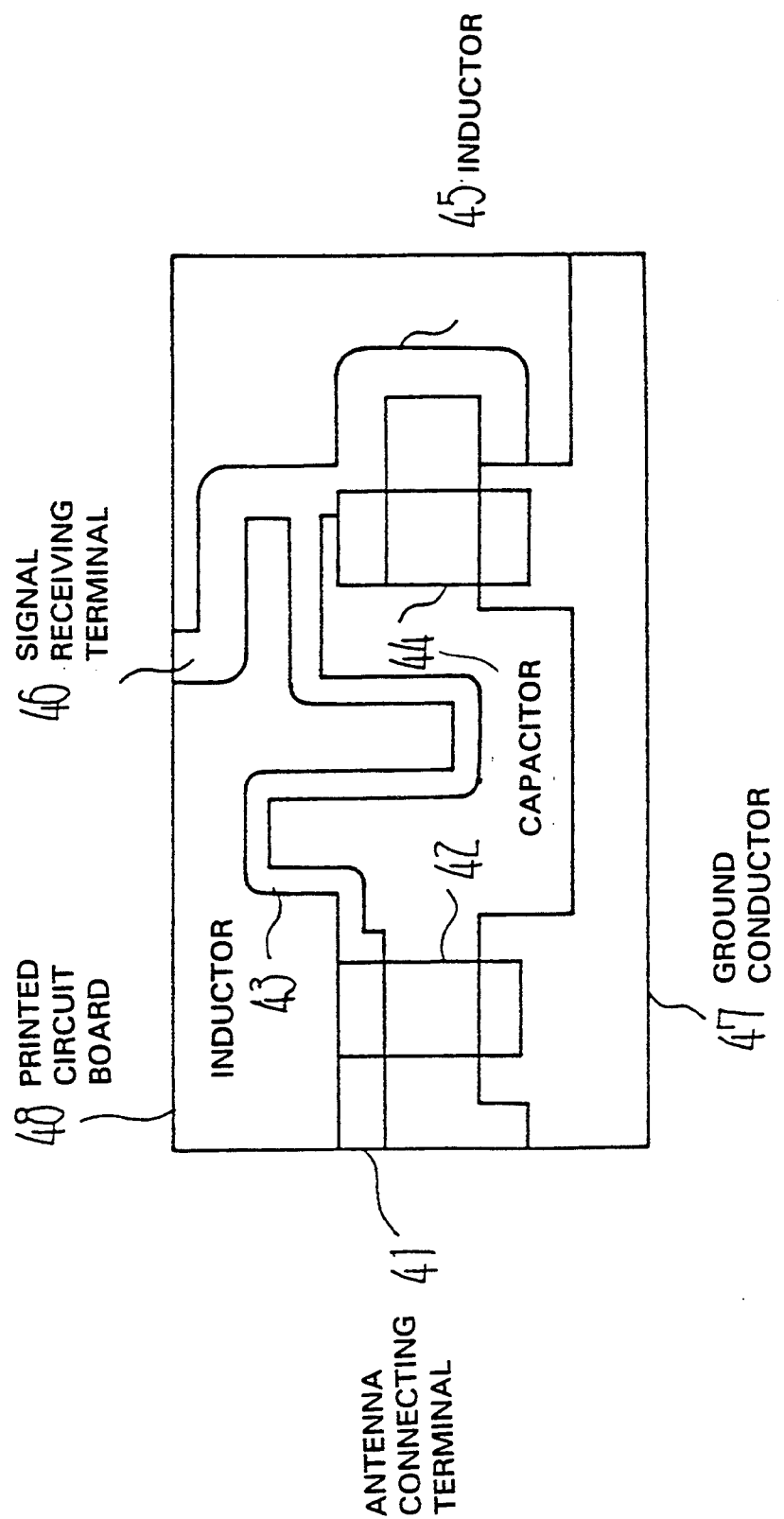
FIG. 3 is an enlarged plan view of an impedance matching circuit 4 of the block diagram in FIG. 1.

Referring to FIG. 3, the matching circuit 4 shown in FIG. 1 is constituted with the chip type capacitors 42 and 44 and the inductors 43 and 45 formed by a printed circuit, all of which are mounted on a printed circuit board 48. The matching circuit 4 further includes the antenna connecting terminal 41, the signal receiving terminal 46 and the ground potential conductor 47, all of which are formed by a printed circuit. In this case, the inductors 43 and 45 can be considered as a distributed constant circuit. Alternatively, the inductors 43 and 45 may be mounted on the printed circuit board 48 as lumped-constant circuits. Errors in setting the inductances of these inductors 43 and 45 can be minimized by employing such a printed circuit.

On the other hand, the capacitors 42 and 44 may be constituted as distributed constant circuits when required capacitances thereof are small.

Further, the matching circuit 4 may be mounted on, for example, a printed circuit board 15 on which are mounted other parts of the radio transceiver.

The method of matching impedance in this embodiment will be described with reference to FIGS. 1 and 4.

Figure 4:
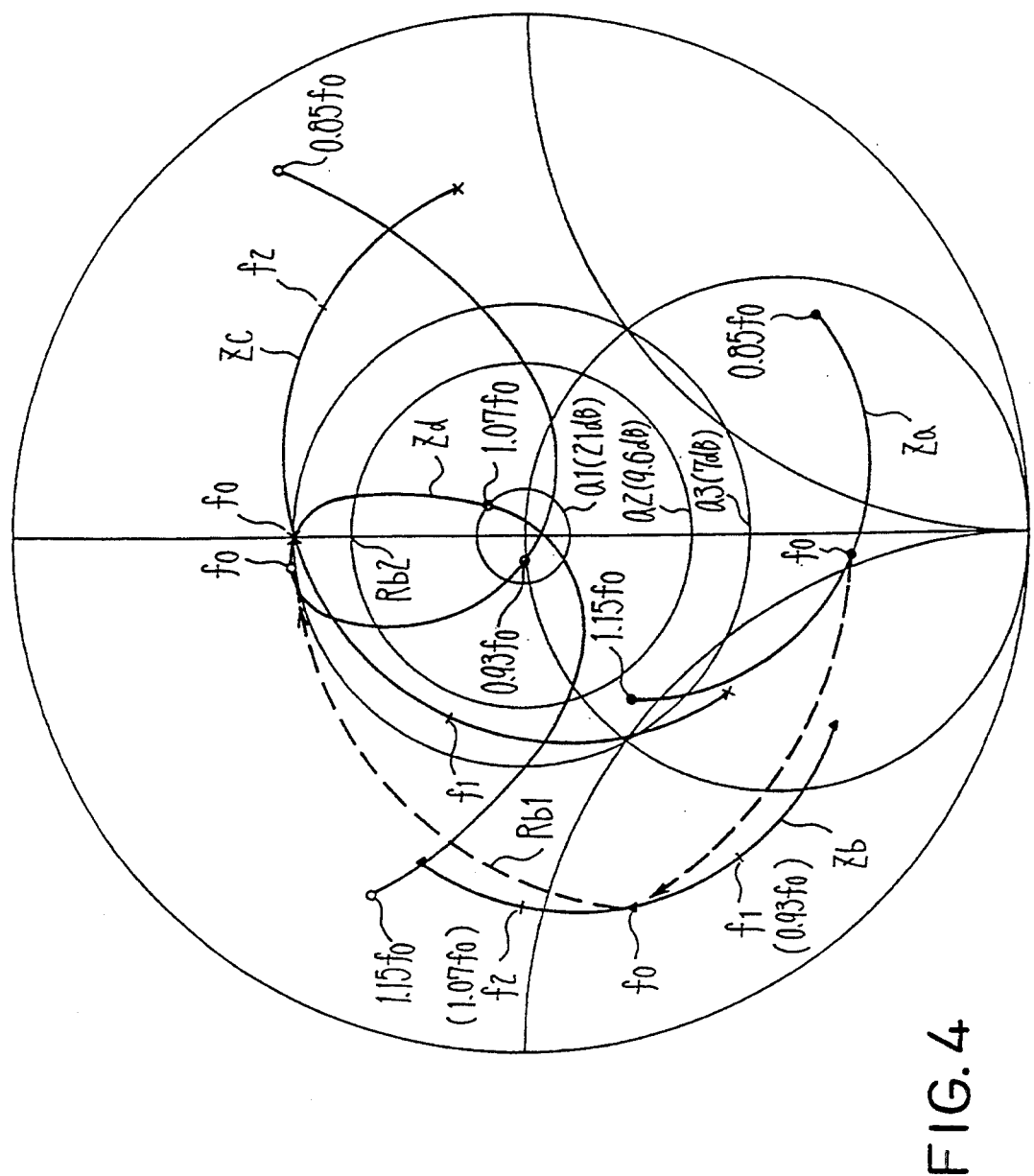
FIG. 4 is a Smith chart explaining the impedance matching between an antenna 1 and a duplexer 5 shown in FIG. 1.

Antenna element length L of the rod antenna 1, the impedance chart of which is shown in FIG. 4, is about 15 cm and its frequency (center frequency) fo at which maximum antenna gain is obtained is about 900 MHz. In the impedance chart in FIG. 4, impedances $Za$, $Zb$, $Zc$ and $Zd$ of the whole antenna circuit including the antenna 1, the support portion 2, the connecting portion 3 and the matching circuit 4 are shown each in a frequency range from 0.85 fo to 1.15 fo. In this case, the transmitting frequency f1 is 0.93 fo, the receiving frequency f2 is 1.07 fo and the impedance of the duplexer 5 as seen from the antenna terminal 51 is 50 ohms.

In FIG. 4, the antenna impedance $Za$ of the antenna 1 as seen from the antenna connecting terminal 41 of the matching circuit 4 is as high as $250\Omega$–$j32\Omega$ ($5$–$j0.64$) at the center frequency fo. It should be noted that the impedance $Za$ includes a reactance component related to the support portion 2 and the connecting portion 3. To impedance $Za$, a susceptance component is added by the capacitor 42. A resistance component of a resultant impedance $Zb$ at the center frequency fo is set to a predetermined fixed standardized resistance Rb1. The susceptance component is about j0.7 at the center frequency fo, which is obtained by setting the capacitance of the capacitor 42 to about 2.5 pF. Then, a reactance component is added to impedance $Zb$ by the inductor 43 and a resultant impedance $Zc$ is set to a pure resistance Rb1 at the center frequency fo. In this case, return-loss at the center frequency fo becomes a3 (in FIG. 4, return-loss is about 7 dB). The above-mentioned reactance component is about j1.3 at the center frequency, which can be obtained by setting inductance of the inductor 43 to about 11.5 nH.

Finally, a susceptance component is added to the impedance $Zc$ by a parallel resonance circuit composed of the capacitor 44 and the inductor 45, resulting in impedance $Zd$ by which a desired matching condition a2 (in FIG. 4, VSWR is 2 or less and return-loss is about 9.6 dB or more) at around the transmitting frequency f1 and the receiving frequency f2, respectively.

In order to make the impedance $Zd$ of the antenna 1 as seen from the signal receiving terminal 46 in matching condition a2 over a full signal frequency band of both the transmitting signal and the receiving signal, it is necessary to set the transmitting frequency f1 and the receiving frequency f2 which are center frequencies of these signals substantially in optimum matching condition a1 (in FIG. 4, VSWR is 1.2 or less and return-loss is about 21 dB or more). In this embodiment, susceptance value which is an inverse of impedance $Zc$ at the transmitting frequency f1 is about +0.9 which differs from about −1.5 at the receiving frequency f2. Therefore, resonance frequency fr of the capacitor 44 and the inductor 45 is set to a value slightly below the center frequency fo (fr=0.9 ·fo) so that susceptance correcting values for the transmitting frequency f1 and the receiving frequency f2 are made different from each other. Thus, impedance $Zd$ is set in optimum matching condition a1 at both of the frequencies f1 and f2. Capacitance of the capacitor 44 of the parallel resonance circuit is about 27 pF and inductance of the inductor 45 is about 1.2 nH.

By selecting values of capacitance of the capacitor 42 and inductance of the inductor 43 such that impedance $Zc$ becomes a pure resistance Rb2 at the center frequency fo, that is, it becomes matching condition a2, it is possible to obtain desired matching condition a2 over continuous transmitting and receiving frequency ranges.

Figure 5:
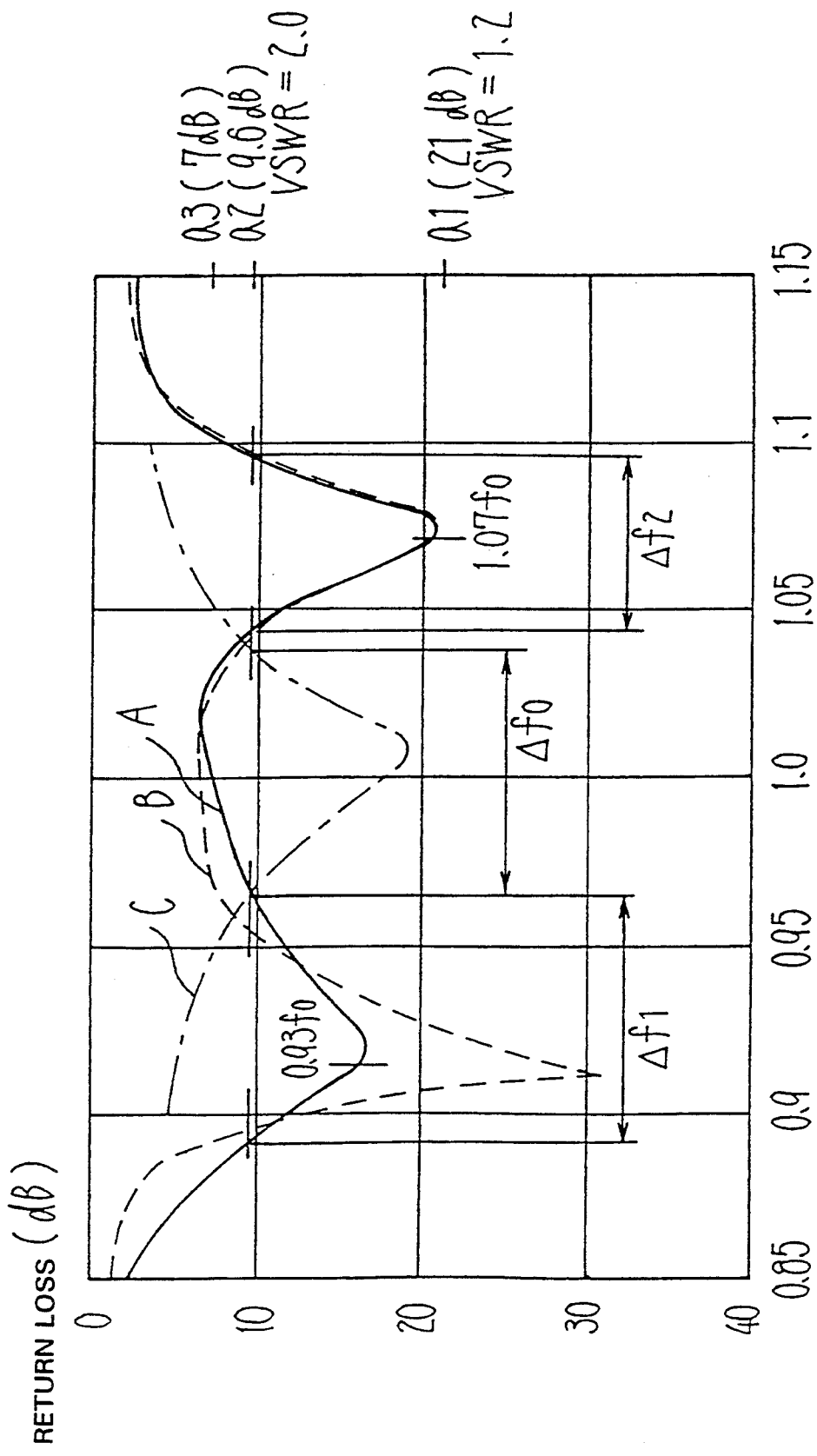
FIG. 5 is a graph showing the impedance matching characteristics of the antenna according to the embodiment shown in FIG. 1 in comparison with that obtained by the conventional circuit design.

FIG. 5 shows return-loss of the antenna 1 measured from the signal receiving terminal 46 of the matching circuit 4, with a dotted curve A obtained by calculation according to the impedance chart shown in FIG. 4, a solid curve B measured by using the present embodiment and a chain curve C measured by using a conventional matching circuit. As shown, the calculated value A and the measured value B exhibit a good coincidence. In the measured curve C, a matching frequency range Δfo with return-loss of 9.6 dB or more (matching condition S2) is about 7% from the center frequency fo for the measured value C, while, in the measured curve B, those Δf1 and Δf2 under the same return-loss condition are 5% or more at the transmitting frequency f1=0.9·fo and the receiving frequency f2=1.07·fo, respectively. Since return-loss at the transmitting frequency f1 and the receiving frequency f2 is in the order of 5.5 dB in the measured curve C, the matching circuit 4 shown in FIG. 1 substantially improves the impedance matching characteristics between the antenna 1 and the duplexer 5 at the respective frequencies f1 and f2.

Figure 6:
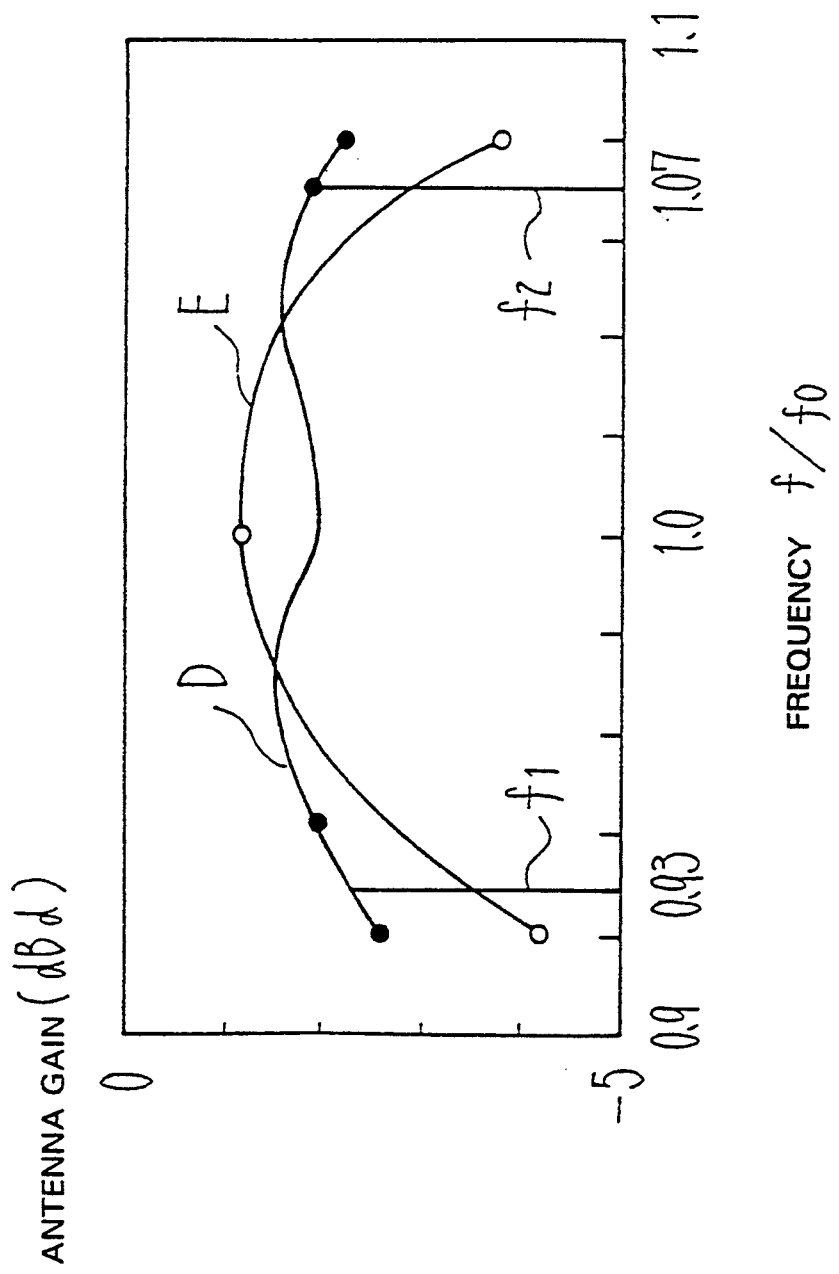
FIG. 6 is a graph showing a gain characteristics corresponding to the impedance matching characteristics shown in FIG. 5.

FIG. 6 is a graph showing a relationship between the gain D (dBd) of the antenna 1 and return-loss B measured from the signal receiving terminal 46 of the matching circuit 4, together with gain E corresponding to the curve C (FIG. 5) of the antenna 1 impedance-matched by the conventional technique. Antenna gain D at around the transmitting frequency f1 and the receiving frequency f2 is improved by about 1 to 2 dB correspondingly to return-loss improvement, compared with antenna gain E.

As described hereinbefore, in the radio transceiver according to the present invention, an impedance conversion circuit is constituted by the inductor 43 connected between the feed point 1a of the rod antenna 1 and the antenna terminal of the duplexer (the antenna terminal 51 of the duplexer 5 in FIG. 1) of the duplexer and the capacitor 42 connected between the feed point 1a and grounding potential, and a parallel resonance circuit is constituted by the inductor 45 and the capacitor 44 connected between the antenna terminal 51 and the grounding potential, and the parallel resonance circuit resonates at an intermediate frequency fo between the transmitting frequency and the receiving frequency. The matching circuit 4 composed of the impedance conversion circuit and the parallel resonance circuit matches, in impedance, the antenna 1 with the transmitting portion and the receiving portion at respective transmitting frequency f1 and the receiving frequency f2 by properly selecting constants of the inductors 43 and 45 and the capacitors 42 and 44. Since this radio transceiver can not only expand the matching range around the intermediate frequency fo but also impedance-match between the antenna 1 and the transmitting and receiving sections at respective transmitting and receiving frequencies f1 and f2 when they are greatly separated from each other, gain reduction of the antenna 1 in the signal bands of the transmitting and receiving frequencies is prevented.

Although the present invention has been described with reference to the specific embodiments, this description is not meant to be construed in a limiting sense. Various modifications of the disclosed embodiments, as well as other embodiments of the present invention, will become apparent to persons skilled in the art upon reference to the description of the present invention. It is, therefore, contemplated that the appended claims will cover any modifications or embodiments as fall within the true scope of the present invention.

What is claimed is:

1. A radio transceiver comprising:
    transmitting means for supplying a transmitting signal having a transmitting frequency to an antenna terminal;
    receiving means for receiving a receiving signal from said antenna terminal having a receiving frequency different from said transmitting frequency of said transmitting signal;
    housing means for housing said transmitting means, said receiving means and said antenna terminal;
    a rod-shaped antenna extendably housed in said housing means and having an antenna element extendable up to a length corresponding to substantially a half of a wavelength corresponding to an intermediate frequency between the frequencies of said transmitting and receiving signals; and
    impedance matching means connected between said antenna terminal and a feed point of said antenna for matching the impedances of said transmitting means and said receiving means as seen from said antenna terminal with an antenna impedance of said antenna as seen from said feed point;
    said impedance matching means comprising:
    an impedance conversion circuit including a first inductor inserted between said antenna terminal and said feed point; and a first capacitor inserted between said feed point and a ground potential; and
    a parallel resonance circuit including a parallel circuit of a second inductor and a second capacitor inserted between said antenna terminal and said ground potential and resonating at a predetermined frequency range surrounding said intermediate frequency.

2. A radio transceiver as claimed in claim 1, wherein said impedance matching means is mounted on a printed circuit board.

3. A radio transceiver as claimed in claim 2, wherein said first and second inductors are in the form of conductor patterns formed on said printed circuit board and wherein said first and second capacitors comprise chip capacitors.

4. A radio transceiver as claimed in claim 2, wherein said impedance matching means further comprises an antenna connecting terminal formed on said printed circuit board and serving as a common connecting point of said first inductor and said first capacitor;
    conductive support means for holding said feed point of said antenna in said housing; and
    connecting means for electrically connecting said support means to said antenna connecting terminal.

5. A radio transceiver as claimed in claim 1, wherein said impedance matching means provides peak impedance matching at predetermined frequency ranges surrounding center frequencies of said transmitting signal and said receiving signal, respectively.

6. A radio transceiver as claimed in claim 4, wherein said impedance matching means provides peak impedance matching at predetermined frequency ranges surrounding center frequencies of said transmitting signal and said receiving signal, respectively.

7. A radio transceiver comprising:
    transmitting means for supplying a transmitting signal having a transmitting frequency to an antenna terminal;
    receiving means for receiving a receiving signal from said antenna terminal having a receiving frequency different from said transmitting frequency of said transmitting signal;
    housing means for housing said transmitting means and said receiving means;
    a rod-shaped antenna extendably housed in said housing means and having an antenna element extendable up to a length corresponding to substantially a half of a wavelength corresponding to an intermediate frequency between the frequencies of said transmitting and receiving signals;
    duplexer means for receiving said receiving signal from said antenna terminal and supplying it to said receiving means and for receiving said transmitting signal from said transmitting means and outputting it from said antenna terminal; and
    impedance matching means connected between a feed point of said antenna and said antenna terminal for matching the impedance of said antenna means as seen from said feed point with the impedance of said duplexer means as seen from said antenna terminal;
    said impedance matching means comprising:
    an impedance conversion circuit comprising a first inductor inserted between said feed point and said antenna terminal; and a first capacitor inserted between said feed point and a ground potential; and
    a parallel resonance circuit including a parallel circuit of a second inductor and a second capacitor inserted between said antenna terminal and said ground potential and resonating at a predetermined frequency range surrounding said intermediate frequency.

8. A radio transceiver as claimed in claim 7, wherein said impedance matching means is mounted on a printed circuit board.

9. A radio transceiver as claimed in claim 8, wherein said first and second inductors are in the form of conductor patterns formed on said printed circuit board and wherein said first and second capacitors comprise chip capacitors.

10. A radio transceiver as claimed in claim 8, wherein said impedance matching means further comprises an antenna connecting terminal formed on said printed circuit board;
    conductive support means for holding said feed point of said antenna in said housing; and
    connecting means for electrically connecting said support means to said antenna connecting terminal.

11. A radio transceiver as claimed in claim 7, wherein said impedance matching means provides peak impedance matching at predetermined frequency ranges surrounding center frequencies of said transmitting signal and said receiving signal, respectively.

12. A radio transceiver as claimed in claim 10, wherein said impedance matching means provides peak impedance matching at predetermined frequency ranges surrounding center frequencies of said transmitting signal and said receiving signal, respectively.

* * * * *